Feb. 7, 1961 — W. E. BOSTON — 2,970,846
FOLDABLE BOAT CARRIER
Filed Nov. 12, 1958 — 2 Sheets-Sheet 1

Warren E. Boston INVENTOR.

Feb. 7, 1961 W. E. BOSTON 2,970,846
FOLDABLE BOAT CARRIER
Filed Nov. 12, 1958 2 Sheets-Sheet 2
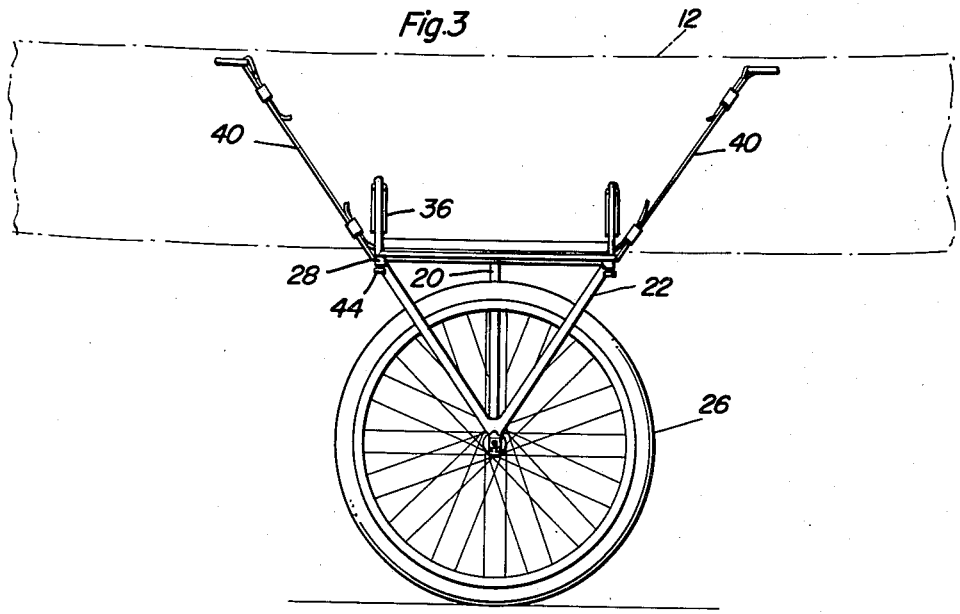
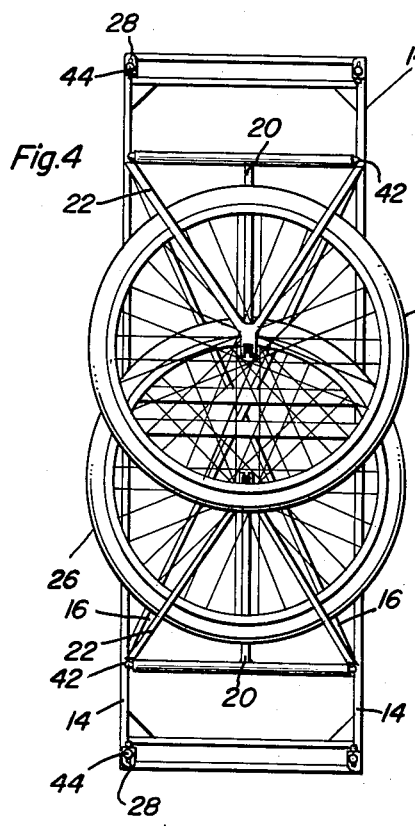
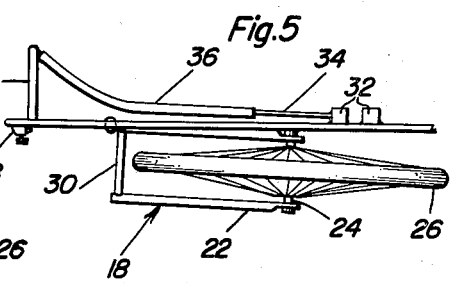
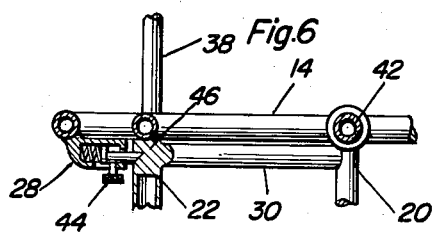
Warren E. Boston INVENTOR.

United States Patent Office 2,970,846
Patented Feb. 7, 1961

2,970,846

FOLDABLE BOAT CARRIER

Warren E. Boston, Rte. 1, Hunlock Creek, Pa.

Filed Nov. 12, 1958, Ser. No. 773,311

3 Claims. (Cl. 280—40)

This invention comprises a novel and useful dolly which may be used to transport small boats to and from the water and more particularly relates to a collapsible dolly which may be folded for storage or shipment in a position requiring very little space.

An important object of this invention is to provide a collapsible dolly for small boats enabling a boat to be handled by one person during launching and/or retrieving operations.

A further object is to provide a collapsible dolly for handling small boats which may be folded for storage or shipment so that it occupies very little space.

A still further object of this invention is to provide a collapsible dolly for small boats which is light in weight and strong in construction and that is easy and inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an end elevational view of the dolly with the outline of a side of a boat strapped thereto shown in phantom lines;

Figure 4 is a view in plan of the device with the leg assemblies shown in folded position;

Figure 5 is a view in elevation of the left side of Figure 2 with the left leg assembly shown in folded position; and Figure 6 is an enlarged detail view of the left side of Figure 2 part being shown in vertical section, and with parts removed.

Figure 1:
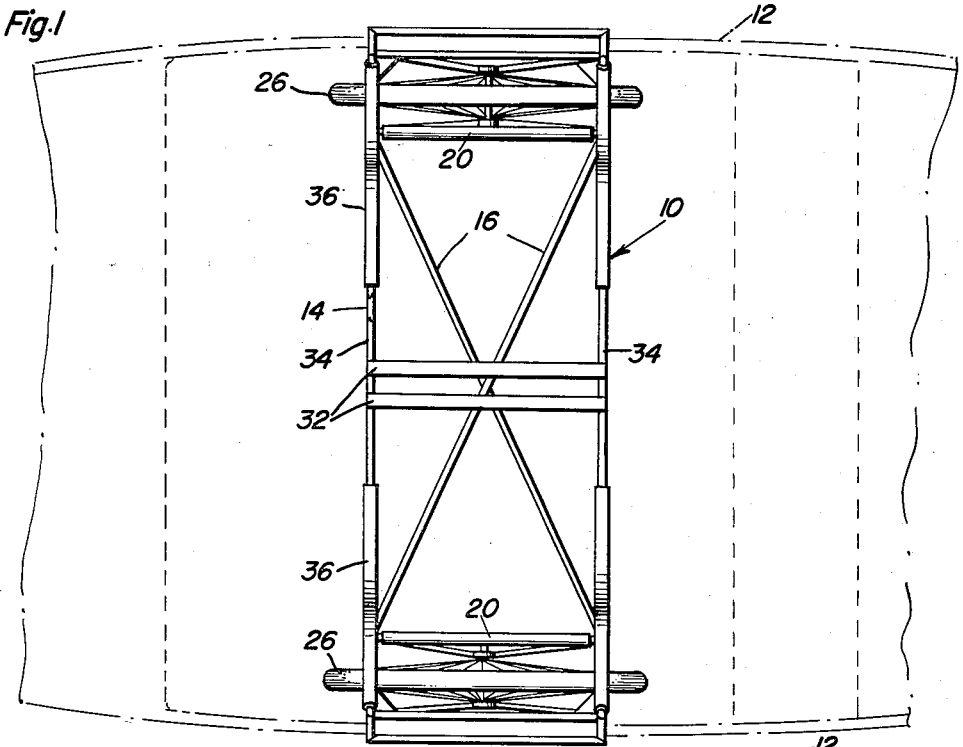
Figure 1 is a top plan view of the dolly with the outline of a boat supported thereby shown in phantom lines.

Referring now more specifically to Figure 1, the numeral 10 generally designates the boat dolly as seen from above supporting a boat 12 shown in phantom lines. The frame 14 is of generally rectangular shape having a pair of reinforcing members 16 crossed diagonally from one side of the frame to the other. The frame is elongated and is adapted to support the under surface of a boat 12 extending transversely thereacross.

Figure 2:
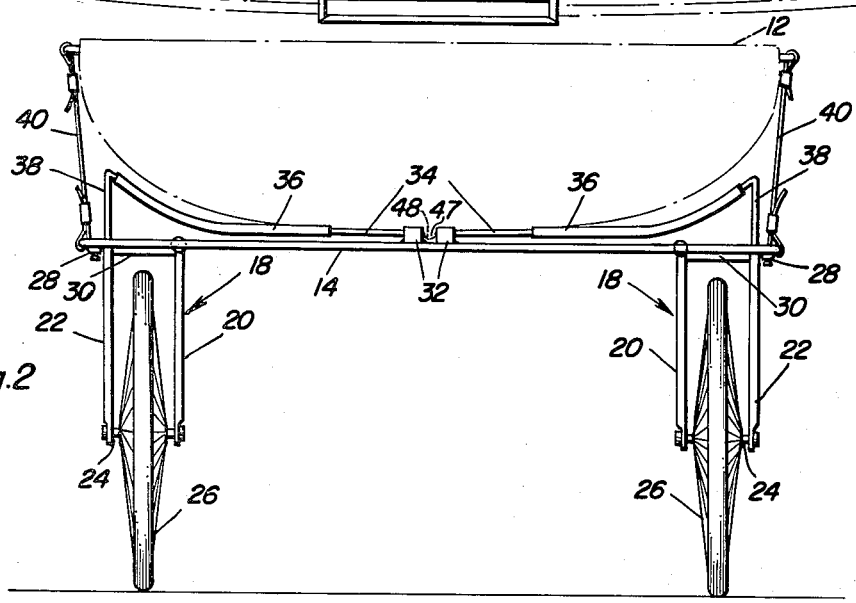
Figure 2 is a side elevational view of the dolly with the outline of a boat which is strapped thereto shown in phantom lines.

As shown in Figure 2 the numeral 18 generally designates the supporting leg assembly comprising an inner pivoted triangularly-shaped section 20 and outer section 22. An axle 24 is journalled between the lower portions of each leg assembly 18 and has pivotally mounted thereon wheel 26. Securing latches 28 are secured to the ends of the frame 10 and engage the upper portion of the outer leg sections 22. A bracing member 30 is secured between the top portions of inner section 20 and outer section 22 of each leg assembly. Mounted on each end of the frame 10 and extending longitudinally thereof is a pair of supporting arms 34, each of the arms 34 having a rubber tube 36 covering a portion thereof. Each supporting arm 34 is connected at one end to one end of the frame at a side thereof by a vertical brace 38 and at the other end to one end of a transversely extending brace 32. There is a brace 32 for each pair of arms 34, the latter extending slightly less than one-half the length of the frame 10. Tie downs 40 are each connected to the boat 12 and to the ends of frame 14 securing the boat upon the dolly. The braces 32 are slightly spaced from each other so as to provide an opening 47 therebetween to receive and properly position the keel 48 of a boat 12 being supported by the dolly 10.

The leg assemblies 18 are pivotally mounted as at 42 on the frame 14, and each leg assembly is held at an extended position by the securing means 28 which includes a spring loaded latch 44 which engages a notch 46 formed in the upper portions of each of the outer leg sections 22.

In operation, the dolly 10 has its leg assemblies 18 extended as shown in Figure 2 in a vertical position, whereupon the latch 44 engages the notch 46 in the upper portion of the outside section 22. The boat 12 is then positioned with its longitudinal axis disposed medially of the frame 14 of the dolly 10 with the arms 34 receiving and supporting the lower surfaces of the boat hull. Tie-downs 40 are then secured to the boat 12 and the frame 14 whereby the boat is temporarily positioned on the dolly.

Since the dolly is secured beneath the mid-portion of the boat, it can be seen that the boat can now be transported either to or from the water by one person holding onto either end of the boat, and that the dolly is highly maneuverable in that it can be maneuvered through a series of turns by merely pivoting one wheel about the other.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a foldable boat dolly comprising an elongated rectangular frame of sufficient length and width to cradle and support the under surface of a boat extending transversely thereacross, a pair of supporting leg assemblies each pivotally mounted on said frame for pivotal movement about a transverse axis adjacent one end of said frame between a folded position and an extended position, means on said frame adapted to embrace the lower surfaces of a boat positioned thereon and means for positioning a boat keel thereon, said positioning means including a pair of spaced transversely extending and parallel brace members secured between the sides of said frame adapted to engage the opposite sides of a depending keel throughout the width of said frame, means on said frame removably securing said leg assemblies in the extended position upon movement of said assemblies to that position, said leg assemblies each engaging said securing means at a point remote from the axis of rotation of said assemblies and comprising an inner section pivotally mounted on said frame and an outer section abutting the underside of said frame when said assemblies are in the extended position, a wheel journaled between the sections of each leg assembly at the lower end thereof about a longitudinally extending axis, said securing means comprising a spring loaded latch mounted on said frame adjacent each leg assembly and engageable with notches formed in the upper portion of each of said outer sections, said embracing means including two longitudinally extending and aligned arms on each side of said frame, each arm having one end thereof mounted to an end of one of said braces, the other ends of said arms curving upwardly and forming a cradle receiving, conforming to, and supporting the lower surfaces of a boat hull, said other ends terminating in downturned vertical sections whose lower ends are connected to said frame.

2. A foldable boat dolly comprising an elongated, rectangular and horizontally disposed frame of sufficient length to cradle and support the under surfaces of a boat extending transversely thereacross, a pair of supporting leg assemblies, means on said frame securing said leg assemblies in an extended depending position, said leg assemblies each comprising substantially parallel inner and outer sections, at least one bracing member secured between the upper ends of corresponding inner and outer sections, a wheel journaled for rotation about a longitudinally extending axis between the lower ends of corresponding inner and outer sections, means pivotally securing the upper end of said inner sections to opposite end portions of said frame for movement about parallel transversely extending axes between a folded position substantially parallel with said frame and an extended depending position, said end portions of said frame projecting beyond the inner sections, the upper ends of said outer sections abutting the under surfaces of said projecting frame end portions and constituting limits defining said extended positions, said securing means carried by the end extremities of said frames and engaging the upper ends of said outer sections retaining said wheel assemblies in the extended positions, said frame including upwardly projecting transversely extending, spaced and parallel braces adapted to engage opposite side surfaces of a depending keel on a boat supported by said dolly throughout the width of said frame, said inner section being triangularly shaped and having one side parallel to the ends of said frame, said outer section being V-shaped with its sides parallel to the depending sides of said inner section, notches formed in the upper ends of the sides of said outer sections, said securing means comprising spring loaded latches mounted on said frame engaging said notches, and means for releasing said latches.

3. The combination of claim 2 wherein said frame includes two longitudinally extending and aligned arms on each side of said frame, each arm having one end thereof mounted to an end of one of said braces, the other ends of said arms curving upwardly and forming a cradle receiving, conforming to, and supporting the lower surfaces of a boat hull, said other ends terminating in downturned vertical sections whose lower ends are connected to said frame.

References Cited in the file of this patent

UNITED STATES PATENTS

| | | |
|---|---|---|
| 1,102,182 | Adams | June 30, 1914 |
| 1,111,663 | McGill | Sept. 22, 1914 |
| 1,409,838 | Emery et al. | Mar. 14, 1922 |
| 2,758,848 | Christensen | Aug. 14, 1956 |
| 2,797,927 | Raff | July 2, 1957 |

FOREIGN PATENTS

| | | |
|---|---|---|
| 542,683 | France | May 20, 1922 |
| 990,506 | France | June 6, 1951 |
| 481,900 | Italy | June 13, 1953 |
| 136,778 | Switzerland | Mar. 1, 1930 |